(12) United States Patent
Hodel et al.

(10) Patent No.: US 7,341,239 B2
(45) Date of Patent: Mar. 11, 2008

(54) VALVE IN PARTICULAR FOR A SANITARY FITTING

(75) Inventors: Benjamin Hodel, Rapperswil (CH); Henning Kaess, Rapperswil (CH)

(73) Assignee: Weidmann Plastics Technology AG, Rapperswill (CH)

( * ) Notice: Subject to any disclaimer, the term of this patent is extended or adjusted under 35 U.S.C. 154(b) by 96 days.

(21) Appl. No.: 11/209,655

(22) Filed: Aug. 24, 2005

(65) Prior Publication Data
US 2006/0289818 A1    Dec. 28, 2006

(30) Foreign Application Priority Data
Jun. 24, 2005    (EP)    .................... 05405407

(51) Int. Cl.
*F16K 31/44*    (2006.01)
(52) U.S. Cl. .................. 251/230; 137/872; 239/449
(58) Field of Classification Search ............... 251/230, 251/215–227; 137/625.48, 872; 239/447, 239/448, 449, 569, 583
See application file for complete search history.

(56) References Cited

U.S. PATENT DOCUMENTS

| | | | |
|---|---|---|---|
| 4,456,222 A | 6/1984 | Shen et al. | |
| 5,048,759 A | 9/1991 | Mazziott et al. | |
| 5,145,114 A | 9/1992 | Monch | |
| 5,383,604 A | 1/1995 | Boesch et al. | |
| 5,546,983 A | 8/1996 | Clare et al. | |
| 5,704,397 A * | 1/1998 | Lu | 137/630.15 |
| 5,707,011 A | 1/1998 | Bosio | |
| 5,727,596 A * | 3/1998 | Eminger | 137/876 |
| 5,918,816 A * | 7/1999 | Huber | 239/391 |
| 6,045,062 A | 4/2000 | Bosio | |
| 6,290,147 B1 | 9/2001 | Bertrand et al. | |
| 6,942,195 B2 * | 9/2005 | Kao | 251/339 |
| 7,104,473 B2 * | 9/2006 | Bosio | 239/449 |
| 2004/0112985 A1 | 6/2004 | Malek et al. | |

FOREIGN PATENT DOCUMENTS

| | | |
|---|---|---|
| DE | 43 26 838 A1 | 2/1995 |
| EP | 1 061 299 A | 12/2000 |
| EP | 1 132 141 A | 9/2001 |

* cited by examiner

*Primary Examiner*—Gregory Huson
*Assistant Examiner*—John K. Fristoe, Jr.
(74) *Attorney, Agent, or Firm*—Sughrue Mion, PLLC

(57) ABSTRACT

The valve has a valve housing (39), in which a valve body (26) is mounted displaceably and preferably rotatably about its longitudinal axis (A). It has at least one valve seat (53, 54), with which the valve body (26) interacts. A button (22) is operationally connected to the valve body (26) in order to displace the valve body (26) from a basic position into a working position. The valve body (26) is controlled in such a way that it is automatically locked releasably in the working position when its displacement from the basic position into the working position takes place.

18 Claims, 5 Drawing Sheets

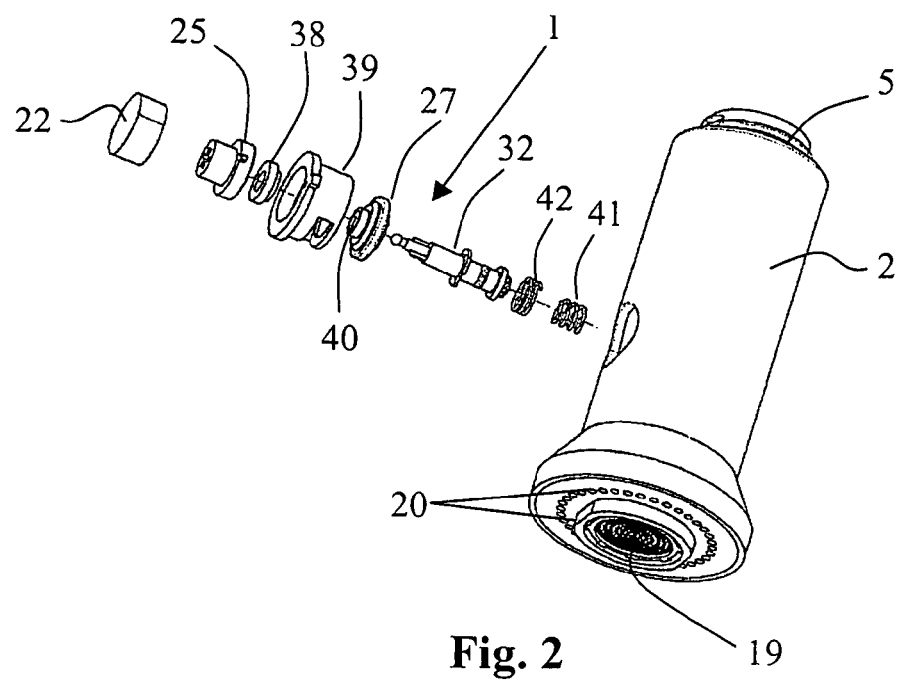
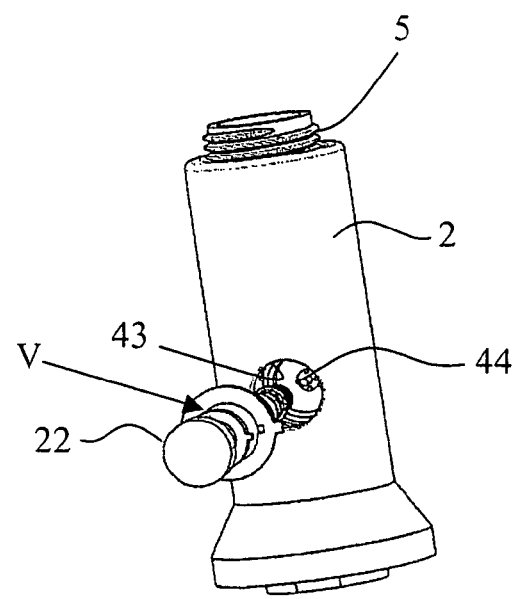
Fig. 2
Fig. 3

VALVE IN PARTICULAR FOR A SANITARY FITTING

The invention relates to a valve, in particular for a sanitary fitting, with a valve housing, in which a valve body is mounted displaceably and which has at least one valve seat, with which the valve body interacts for opening and closing a fluid passage and with actuating means, which are operationally connected to the valve body and with which the valve body can be displaced from a basic position into a working position.

BACKGROUND OF THE INVENTION

A valve of this kind has become known in the prior art from U.S. Pat. No. 5,383,604, for example. The valve is a change-over valve of a spray head. The valve body can be displaced between two positions. In one position, a passage to a jet former is open, and, in the other position, a passage to a number of nozzles for forming a spray jet is open. A two-armed lever, which is arranged below a diaphragm, is provided for actuation. Two pressing positions are provided, which are arranged at a spacing from one another and act on the one and respectively the other arm of the two-armed lever. A third position is moreover provided, which makes it possible to maintain a set position even without water pressure. For the user, it is not readily identifiable in which position the valve is located.

A valve which is likewise a change-over valve in a spray head has become known through US 2004/0112985 A. In this case, the actuating means comprise a lever, which returns to the basic position or rest position again after every actuation. For the user, it is consequently not identifiable in which position the valve is or whether jet or spray is set. Moreover, when the water is turned off and thus the water flow is interrupted, the valve is automatically changed over into the basic position again.

A further valve designed as a change-over valve has become known through EP-A-1 132 141. In this case too, the valve body returns automatically to the basic position by means of a spring after the water has been turned off.

Further similar valves have become known in the prior art through U.S. Pat. No. 6,290,147, U.S. Pat. No. 6,045,062, U.S. Pat. No. 5,707,011 and U.S. Pat. No. 5,145,114.

SUMMARY OF THE INVENTION

The object of the invention is to provide a further valve of this kind, which is suitable in particular for a spray head and avoids said disadvantages.

The object is achieved in a valve of the generic type according to claim 1. The valve according to the invention can be operated similarly to a ballpoint pen mechanism. In the working position, the valve body is locked and does not pass into the basic position automatically when the water is turned off. The valve is consequently stable in the position at the time with or without water pressure, and consequently no energy is required in order to maintain the two positions. The valve according to the invention is therefore also suitable for actuation with electromagnetic means or the like, for example. In this connection, the energy consumption can be kept low, so that such electromagnetic actuating means can be supplied by a battery, for example.

A major advantage of the valve according to the invention is that, with actuation by hand by means of a button, actuation with only one actuation location is possible. The valve can thus be brought from the basic position into the working position and from the working position into the basic position by pressing in the same actuation location. Actuation is consequently possible in a similar way to with a ballpoint pen. Such actuation is readily identifiable and learnable for the operating person. In the working position, the valve body is automatically locked, so that it is not necessary for this to press again or in another location.

A further advantage is that the valve can be actuated with a button which is connected firmly to the valve body and in the working position of the valve body occupies a position which is visually distinguishable from the basic position. For example, the button projects in the basic position and is flush with a housing in the working position.

According to a development of the invention, a change-over part, which interacts with the valve body and rotates the latter by a predetermined angle when displacement from the basic position into the working position takes place, is provided on the water-conveying pipe. This change-over part could also be arranged on the valve housing. This change-over part can be produced simply and cost-effectively by means of parts which are injection-molded on, for example. This change-over part is preferably designed in such a way that it interacts with operating means at a front end of the valve body. The change-over part can be produced very simply and cost-effectively as tooth-shaped projections on the inner side of the valve housing.

According to a development of the invention, the valve has an operating element, in which the valve body is mounted displaceably and which has control surfaces, which interact with said locking means and hold the valve body in the working position counter to the force of a spring element. Such an operating element can be produced especially advantageously as a sleeve-shaped part. According to a development of the invention, this part is connected to the valve housing, for example inserted into a recess of the valve housing.

According to a development of the invention, the control surfaces on the operating element are designed in such a way that they rotate the valve body by a predetermined angle before the working position is reached, so that, when renewed actuation takes place, the locking of the valve body is released and the valve body can be displaced into its basic position. The release of the locking of the valve body in the working position is according to this development effected by renewed actuation, the valve body being displaced in the same direction. In this connection, the release can be effected with a comparatively small displacement of the valve body.

According to a development of the invention, the valve body has a valve disk, which is mounted axially displaceably and/or rotatably on a stem of the valve body. By virtue of this, it is possible to release the working position again by "overpressing" the valve body. In this connection, it is especially expedient if according to a development of the invention the valve disk is sealed in relation to the stem. Sealing is preferably effected with a sealing ring, which is located in a groove of the stem.

According to a development of the invention, the valve according to the invention is a change-over valve, the valve body bearing against a first valve seat in the basic position and against a second valve seat in the working position. In one position of the valve body, a first passage is free, and, in the second position, a second passage is free. However, the valve according to the invention can also be a simple shut-off valve with only one valve seat. The valve is then closed in the basic position and open in the working position.

The invention also relates to a sanitary fitting with a valve according to the invention. This preferably has at least one spray outlet and at least one jet outlet. With the valve, change-over between jet and spray is possible in an especially reliable and simple way.

According to a development of the invention, the water outlet is designed in such a way that the valve is arranged in a housing and the actuating means is a button, which projects on the housing in the basic position and is essentially flush with the outer side of the housing in the working position. For the user, the working position is thus visually distinguishable from the basic position. As actuation in only a single actuation location is possible, as already mentioned, a water outlet is thus produced which is very simple and safe to actuate.

According to a development of the invention, the water outlet is designed as a spray head. The spray head can be arranged on a shower fitting or on a fitting for a water basin.

BRIEF DESCRIPTION OF THE DRAWINGS

Illustrative embodiments of the invention are explained in greater detail below with reference to the drawing, in which:

FIG. 2 shows a three-dimensional view of the water outlet according to FIG. 1, parts of the valve being exploded;

FIG. 3 shows a further view of the water outlet with the valve removed;

FIG. 5b shows a section through the operating element according to FIG. 5a;

DETAILED DESCRIPTION OF THE INVENTION

Figure 1:
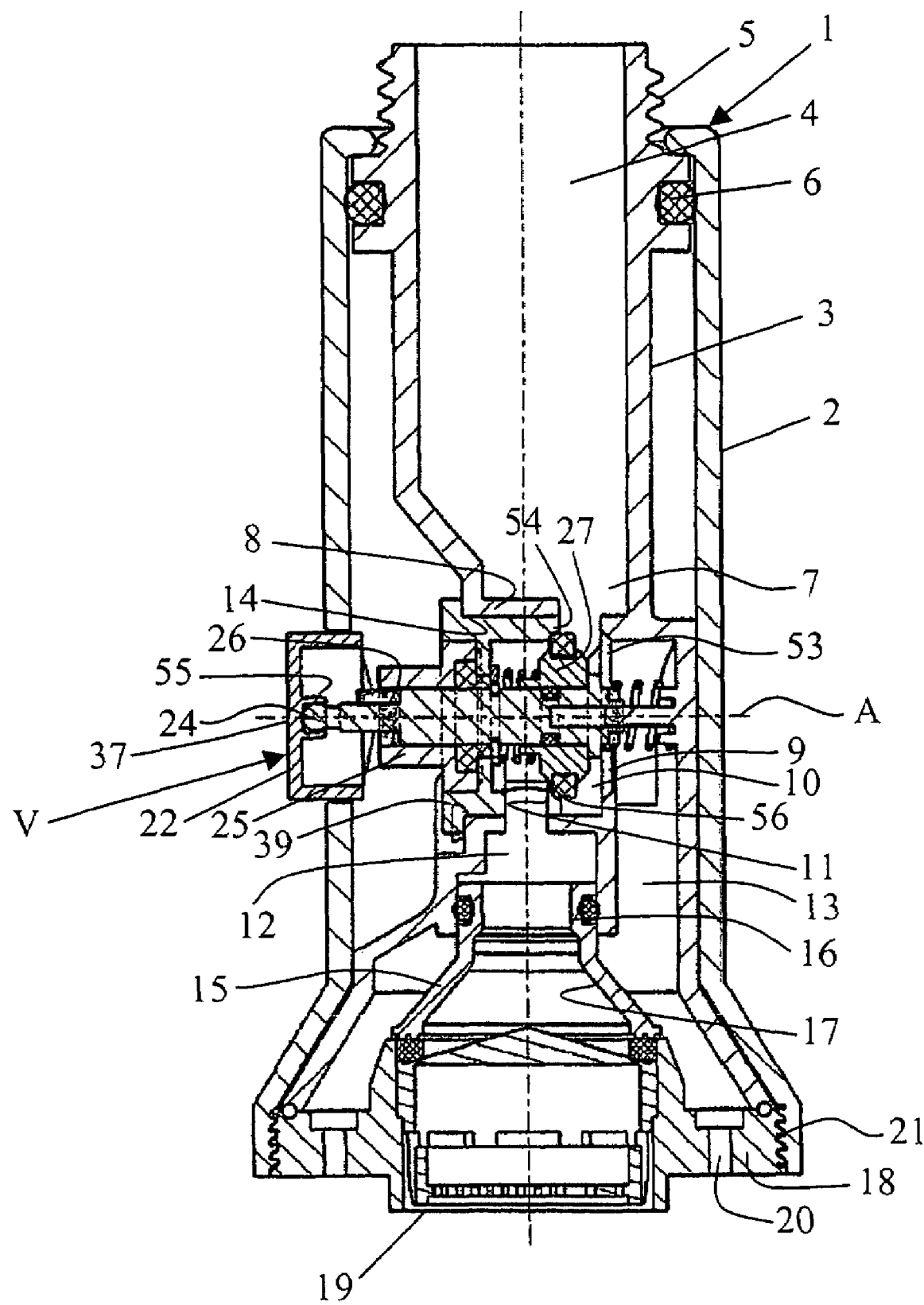
FIG. 1 shows a longitudinal section through a water outlet with a valve according to the invention.

FIG. 1 shows a spray head 1, which has in a housing 2 a water-conveying pipe 3, which has at an end projecting from the housing 2 a connection thread 5 for connecting the spray head 1 to a flexible water line (not shown here). The spray head 1 is intended in particular for a pull-out spray, in which said line is guided in a fitting in such a way that the spray head 1 can be pulled out by hand.

The water-conveying pipe 3 is sealed with a sealing ring 6 in relation to the housing 2 and has at a front end a funnel-shaped connecting part 15, which is sealed with a sealing ring 16 in relation to the water-conveying pipe 3. The connecting part 15 connects the water-conveying pipe 3 to a jet former 19 known per se. The jet former 19 is inserted centrally into a mouth plate 18, which is connected detachably to the housing 2 via a thread 21. A number of nozzles 20 are arranged in a ring shape on this mouth plate 18 for forming a spray jet, as in particular FIG. 2 shows. Such nozzles 20 are known per se to the expert.

The water-conveying pipe 3 has a water duct 4, which can via a valve V be connected alternatively to the jet former 19 via a passage 12 or to the nozzles 20 via a passage 13. The passage 12 is connected to the spray insert 19 via a passage 17 of the connecting part 15. The valve V is a change-over valve, in which the water duct 4 is connected to the nozzles 20 in the basic position according to FIG. 1. In the other position, which is described here as the working position, the duct 4 is connected to the jet former 19.

The valve V has a valve housing 39, which is inserted in a watertight manner into an opening 14 of the water-conveying pipe 3. The opening 14 is formed through a wall 8, which also has openings 7, 9 and 11. The opening 7 forms an entrance to a space 10 and the opening 11 an exit of the space 10 into the passage 12. The opening 9 connects the space 10 to the passage 13. The wall 8 is part of the water-conveying pipe 3. It forms a valve seat 53, with which a valve body 26 interacts. The valve housing 39 forms a further valve seat 54, with which the valve body 26 likewise interacts. An operating element 25, in which the valve body 26 is limitedly displaceable in its longitudinal direction, is arranged on the valve housing 39. The valve body 26 is sealed with an elastomeric sealing element 38 in relation to the housing 39 and the operating element 25. According to FIG. 3, the valve V is inserted into the housing 2 via an elongate opening 43 therein. The opening 43 receives a button 22. The button 22 is designed as a push button, which is movable in the longitudinal direction of the valve body 26. In principle, the button 22 could also be designed as a one-armed pivot lever, for example.

The valve body 26 has at a front end a ball-shaped connecting part 24, which is engaged rotatably in a sleeve-shaped holding part 55 of the button 22. The sleeve-shaped holding part 55 is formed on an inner side of the button 22. The valve body 26 is thus connected firmly but axially rotatably to the button 22. In the position shown of the valve V, a valve disk 27 of the valve body 26 bears according to FIG. 1 against the valve seat 54. Above the holding part 55, a pressing location 37, in which the button 22 can be actuated by hand, is located on the outer side of the button 22. Actuation takes place by pressing the button 22. During this operation, the button 22 passes from the basic position shown in FIG. 1 into the working position shown in FIG. 7. In the process, the valve body 26 is displaced in its longitudinal direction counter to the reacting force of a first spring 41. As is explained in greater detail below, the valve body 26 remains locked in this position. The button 22 likewise remains in the position shown in FIG. 7, as it is firmly connected to the valve body 26 as explained. As can be seen, the outer side of the button 22 is essentially flush with the outer side of the housing 2. In this position, the water duct 4 is connected to the jet former 19. The working position can be released by the button 22 being adjusted by a comparatively small angle in the same direction inward into the position shown in FIG. 8. When the button 22 is released, the valve body 26 then returns automatically to the basic position according to FIG. 1 again.

Figure 4A:
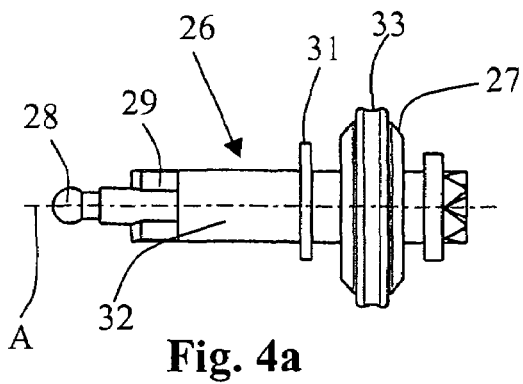
FIG. 4a shows a view of the valve body.
Figure 4D:
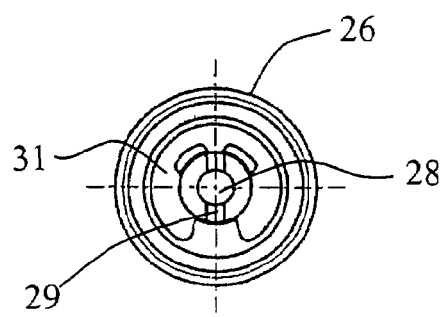
FIG. 4d shows an axial view of the front end of the valve body.
Figure 4C:
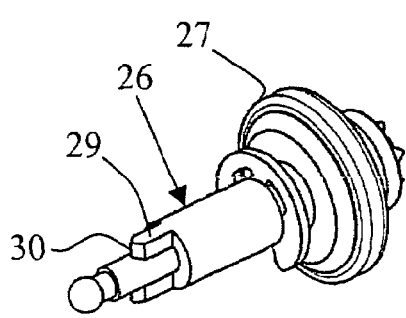
FIG. 4c shows a further three-dimensional view of the valve body.
Figure 5A:
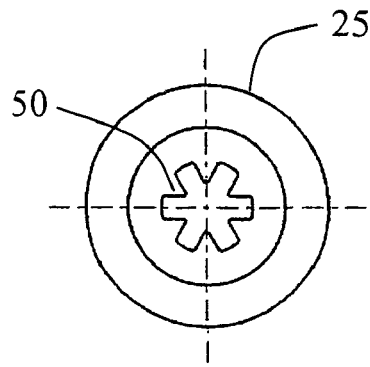
FIG. 5a shows a view of an operating element.
Figure 5D:
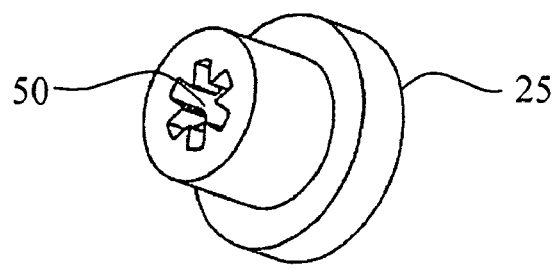
FIG. 5d shows a further three-dimensional view of the operating element.
Figure 5B:
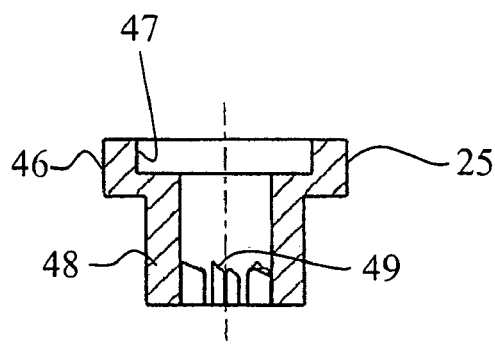
Figure 5C:
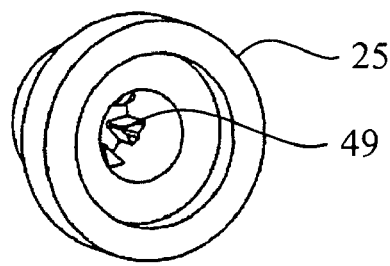
FIG. 5c shows a three-dimensional view of the operating element.
Figure 6:
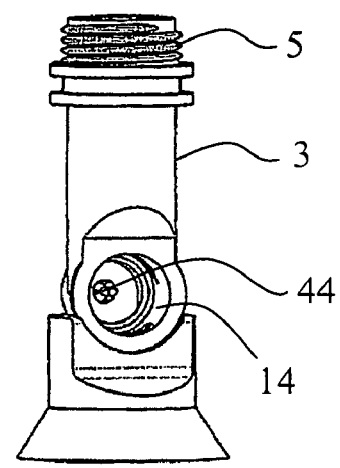
FIG. 6 shows a view of the valve housing.

The valve body 26 has an essentially cylindrical stem 32, which has two opposite operating cams 29 on its outer side near the connecting part 28. According to FIG. 4c, these each have an edge 30 directed radially outward and toward the connecting part 28. The two operating cams 29 are guided displaceably in the direction of a longitudinal axis A in a star-shaped opening 50 of the operating element 25 (FIGS. 5*a* to 5*c*). Control surfaces 49, which interact with the operating cams 29, are arranged in the opening 50. These control surfaces 49 are located on the inner side of a cylindrical projection 48 of the operating element 25. A flange 46, with which the operating element 25 is attached to the valve housing 39, is formed on the projection 48. The sealing element 38 mentioned above is inserted in a passage 47. According to FIG. 5*c*, said control surfaces 49 in each case form notch-like depressions, in which the operating cams 29 engage in the working position of the valve V. In this connection, the valve body 26 is stressed against these control surfaces 49 owing to the stress of said first spring 41. The control surfaces 49 are arranged asymmetrically in such a way that with every engagement on the valve body 26 they bring about a given rotation about the longitudinal axis of the valve body 26.

Figure 4B:
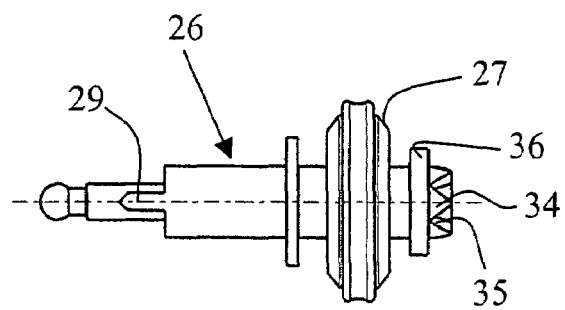
FIG. 4b shows a further view of the valve body.
Figure 4E:
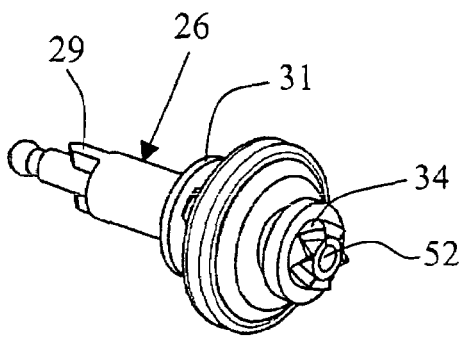
FIG. 4e shows a three-dimensional view of the valve body.

The valve body 26 has at its front end operating teeth 34, which have operating surfaces 35, which extend at an angle to the longitudinal axis A, as is shown in FIGS. 4*b* and 4*e*, for example. These operating teeth 34 are arranged in a crown-shape around a recess 52 and cooperate with a change-over part 44, which is formed on an inner side of the water-conveying pipe 3. The change-over part 44 is formed by projecting cams, between which a pin 51 is arranged, which engages in the recess 52. By virtue of this, the front end of the valve body 26 is guided axially displaceably in the direction of the longitudinal axis A and rotatably in the longitudinal direction of the valve body 26 on the pin 51 and thus on the water-conveying pipe 3. Owing to this guidance, the operating teeth 34 are brought-into engagement with the change-over part 44 when displacement of the valve body 26 takes place during the transition from the basic position into the working position. This is explained in greater detail below.

Figure 7:
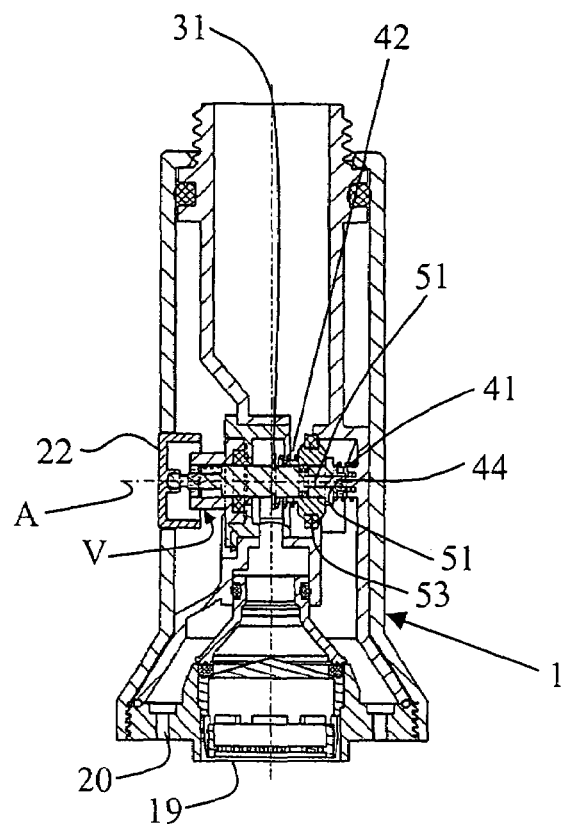
FIG. 7 shows a section through part of the water outlet, the valve being shown in the working position.

If the valve body 26 is displaced in the direction of the longitudinal axis A from the position shown in FIG. 1 into the position shown in FIG. 7 by actuating the button 22, the two opposite operating cams 29 leave the opening 50. The valve body 26 is moved on its longitudinal axis A until the two operating cams 29 have left the opening. Immediately after this, the operating teeth 34 enter into engagement with the change-over part 44, by virtue of which the valve body 26 is rotated by an angle of 30°, for example. If the button 22 is then released, the valve body 26 is displaced back a little way in the direction of its longitudinal axis A owing to the stress of the first spring 41. Owing to said rotation of the valve body 26, the operating cams 29 now enter into engagement with the control surfaces 49 of the operating element 25. During this engagement, the valve body 26 is now rotated again by a predetermined angle owing to said asymmetry. The two operating cams 29 now bear against the control surfaces 49, so that these lock the valve body 26 in the position shown in FIG. 7. The valve body 26 can consequently no longer return to the starting position shown in FIG. 1. The button 22, which is connected to the valve body 26, likewise remains in the position shown in FIG. 7 owing to this locking. In this connection, the valve disk 27 bears against the valve seat 53, said second spring 42 stressing the valve disk 27 against this valve seat 53. In this connection, the stressed spring 42 is supported on a ring 31, which is inserted in a groove (not described further here) of the stem 32. The seal between valve seat 53 and valve disk 27 is ensured by means of a sealing ring 56, which is inserted in a groove 33 (FIG. 4*a*) of the valve disk 27. The stressing of the spring 42 can also be brought about by another suitable pressing element.

In the position of the valve body 26 shown in FIG. 7, the water passes from the water duct 4 to the jet former 19. The passage to the nozzles 20 is closed by the valve disk 27 bearing against the valve seat 53. If the water is now turned off at a cock (not shown here), so that water no longer flows through the water duct 4, the valve body 26 remains in the position shown in FIG. 7. The button 22 likewise remains in the position shown. If the cock (not shown here) is opened again, water flows from the water duct 4 to the spray insert 19 again.

Figure 8:
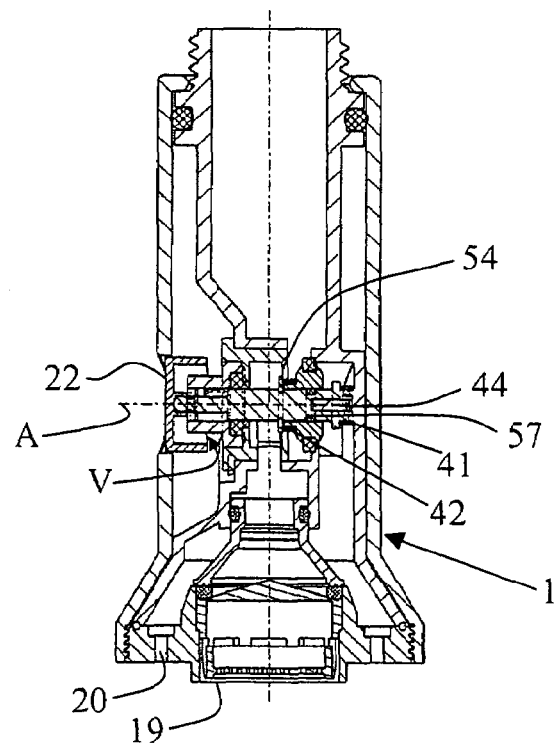
FIG. 8 shows a section according to FIG. 7, the valve being located in what may be referred to as an overpressed position.

In order to change the valve V over to the basic position shown in FIG. 1 again, the button 22 is adjusted from the position shown in FIG. 7 into the position shown in FIG. 8. The valve body 26 is moved inward accordingly. During this operation, the two springs 42 and 41 are further stressed and the pin 51 penetrates further into the recess 52. The valve disk 27 cannot follow in this movement and remains on the valve seat 53. The valve disk 27 is therefore limitedly displaceable on the valve body 26, a sealing ring 57 bearing against an opening 40 of the valve disk 27. In the position according to FIG. 1, the spring 41, with the ring 36, stresses the valve disk 27 against the valve seat 54. The stem 32 of the valve body 26 is displaced accordingly relative to the valve disk 27 from the position shown in FIG. 7 into the position shown in FIG. 8. Simultaneously with said displacement of the valve body 26 in the direction of the longitudinal axis A, the valve body 26 is rotated by a given angle about its longitudinal axis A by the engagement of the operating teeth 34 with the change-over part 44. The operating cams 29 are rotated accordingly, so that, when the button 22 is released, these operating cams 29 no longer enter into engagement with the control surfaces 49 of the operating element 25. When the button 22 is released, the valve body 26 is consequently displaced together with the button 22 into the position shown in FIG. 1 again by the stress of the first spring 41. During this operation, the valve disk 27 is displaced on the stem 32 and likewise passes into the position shown in FIG. 1 again, in which it bears against the valve seat 54 and thus interrupts the passage from the water duct 4 to the passage 12. The water now flows from the water duct 4 via the space 10 into the passage 13 and thus to the nozzles 20. The button 22 is now in the projecting position as shown in FIG. 1. This projecting position can be clearly visually distinguished from the pressed position shown in FIG. 7.

The button 22 can also be replaced by another actuating means. For example, the valve body 26 can be displaced with an electromagnetic drive known per se as explained above. As the two said positions are stable, only power for changing-over is required. On the basis of such a drive, contactless actuation is possible, for example. In principle, other drive means, for example hydraulic or pneumatic drives and the like, can be provided in order to actuate the valve body 26 as explained above.

In the embodiment shown, the valve V is a change-over valve. However, the valve V can in principle also be a different valve, for example a shut-off valve. In this case, the valve seat 53, for example, is not present. In the position of the valve V shown in FIG. 1, the sole passage is then shut off, and, in the position shown in FIG. 7, the passage is open.

LIST OF REFERENCES 1 spray head
2 housing
3 water-conveying pipe
4 water duct
5 connection thread
6 sealing ring
7 opening
8 wall
9 opening
10 space
11 opening
12 passage
13 passage
14 opening
15 connecting part
16 sealing ring
17 passage
18 mouth plate
19 jet former
20 nozzle
21 thread
22 button
24 connecting part
25 operating element
26 valve body
27 valve disk
28 connecting part
29 operating cam
30 edge
31 ring
32 stem
33 groove
34 operating tooth
35 operating surface
36 ring
37 pressing location
38 sealing element
39 valve housing
40 opening
41 first spring
42 second spring
43 opening
44 change-over part
46 flange
47 passage
48 projection
49 control surface
50 opening
51 pin
52 recess
53 valve seat
54 valve seat
55 holding part
56 sealing ring
57 sealing ring
A longitudinal axis
V valve

The invention claimed is:
1. A valve for a sanitary fitting, comprising:
a valve housing;
a valve body mounted displaceably in said valve housing, wherein said valve housing has at least one valve seat, with which the valve body interacts for opening and closing a passage; and
actuating means, which are operationally connected to said valve body for displacing said valve body from a basic position into a working position,
wherein said valve is a change-over valve, and
wherein said valve body closes a first passage in the basic position and closes a second passage in the working position, and wherein the valve body rotates about its longitudinal axis as it is being displaced into from the basic position into the working position,
wherein the valve body is released from the working position by moving along its longitudinal axis toward the valve seat.

2. The valve as claimed in claim 1, wherein the valve body is connected rotatably to the actuating means.

3. The valve as claimed in claim 1, wherein a change-over part, which interacts with the valve body and rotates the latter by a predetermined angle when its displacement from the basic position into the working position takes place, is arranged on a water-conveying pipe.

4. The valve as claimed in claim 3, wherein the change-over part interacts with operating means at a front end of the valve body.

5. The valve as claimed in claim 4, wherein the operating means at the front end of the valve body comprise tooth-shaped projections, which project axially.

6. The valve as claimed in claim 1, wherein the valve body can be displaced from the basic position into the working position counter to the reacting force of a spring element.

7. A sanitary fitting with a valve as claimed in claim 1.

8. The sanitary fitting as claimed in claim 7, wherein the valve is arranged in a housing and the actuating means comprise a button, which projects on the housing in the basic position and is essentially flush with the outer side of the housing in the working position.

9. A valve for a sanitary fitting, comprising:
a valve housing;
a valve body mounted displaceably in said valve housing, wherein said valve housing has at least one valve seat, with which the valve body interacts for opening and closing a passage; and
actuating means, which are operationally connected to sad valve body for displacing said valve body from a basic position into a working position,
wherein said valve is a change-over valve, and
wherein said valve body closes a first passage in the basic position and closes a second passage in the working position, and wherein the valve body rotates about its longitudinal axis as is being displaced into from the basic into the working positions,
wherein a change-over part, which interacts with the valve body and rotates the latter by a predetermined angle when its displacement from the basic position into the working position takes place, is arranged on a water-conveying pipe,
wherein the change-over part is parts projecting in a cam shape, between which, for guiding the valve body, a pin projects, which engages in a recess of the valve body.

10. A valve for a sanitary fitting, comprising:
a valve housing;
a valve body mounted displaceably in said valve housing, wherein said valve housing has at least one valve seat, with which the valve body interacts for opening and closing a passage; and
actuating means, which are operationally connected to said valve body for displacing said valve body from a basic position into a working position,
wherein said valve is a change-over valve, and wherein said valve body closes a first passage in the basic position and closes a second passage in the working position, and wherein the valve body rotates about its longitudinal axis as it is being displaced into from the basic position into the working position, wherein an operating element, in which the valve body is displaceable and which has control surfaces, which interact with a locking means, is arranged on the valve housing, said locking means being arranged on the valve body and locking the valve body in the working position counter to the force of a spring element.

11. The valve as claimed in claim 10, wherein the operating element is of sleeve-shaped design.

12. The valve as claimed in claim 10, wherein the operating element is sealed with sealing means in relation to the valve body.

13. The valve as claimed in claim 10, wherein the control surfaces of the operating element are designed in such a way that they rotate the valve body by a predetermined angle before the working position is reached, so that, when renewed actuation takes place, the locking of the valve body is released and the valve body can be displaced into its basic position.

14. A valve for a sanitary fitting, comprising:
a valve housing;
a valve body mounted displaceably in said valve housing, wherein said valve housing has at least one valve seat, with which the valve body interacts for opening and closing a passage; and
actuating means, which are operationally connected to said valve body for displacing said valve body from a basic position into a working position,
wherein said valve is a change-over valve, and
wherein said valve body closes a first passage in the basic position and closes a second passage in the working position, and wherein the valve body rotates about its longitudinal axis as it is being displaced into from the basic position into the working position, wherein the valve body has a valve disk, which is mounted axially displaceably and/or rotatably on a stem of the valve body.

15. The valve as claimed in claim 14, wherein the valve disk is sealed displaceably in relation to the stem.

16. The valve as claimed in claim 14, wherein a spring element, which is operationally connected to the valve disk and in the working position of the valve stresses the valve disk against the valve seat, is arranged on the stem of the valve body.

17. A sanitary fitting with a valve, comprising:
a spray head, in which the valve is arranged, and
wherein the valve comprises:
a valve housing;
a valve body mounted displaceably in said valve housing, wherein said valve housing has at least one valve seat, with which the valve body interacts for opening and closing a passage; and
actuating means, which are operationally connected to said valve body for displacing said valve body from a basic position into a working position,
wherein said valve is a change-over valve, and
wherein said valve body closes a first passage in the basic position and closes a second passage in the working position, and wherein the valve body rotates about its longitudinal axis as it is being displaced into from the basic position into the working position.

18. A spray head with a valve, as claimed in claim 1.

\* \* \* \* \*